United States Patent
Cropper et al.

(10) Patent No.: US 9,703,592 B2
(45) Date of Patent: *Jul. 11, 2017

(54) VIRTUAL MACHINE MIGRATION MANAGEMENT

(71) Applicant: International Business Machines Corporation, Armonk, NY (US)

(72) Inventors: Joseph W. Cropper, Rochester, MN (US); Taylor D. Peoples, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/055,533

(22) Filed: Feb. 27, 2016

(65) Prior Publication Data

US 2017/0139732 A1 May 18, 2017

Related U.S. Application Data

(63) Continuation of application No. 14/940,081, filed on Nov. 12, 2015.

(51) Int. Cl.
G06F 9/455 (2006.01)

(52) U.S. Cl.
CPC .. G06F 9/45558 (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | | |
|---|---|---|---|---|
| 7,207,043 B2* | 4/2007 | Blythe | ............... | G06F 9/505 705/400 |
| 8,185,894 B1* | 5/2012 | Watson | ............... | G06F 9/485 718/1 |
| 8,332,847 B1* | 12/2012 | Hyser | ............... | G06F 9/45558 718/1 |
| 2008/0163239 A1* | 7/2008 | Sugumar | ............... | G06F 9/5088 718/105 |
| 2009/0265706 A1 | 10/2009 | Golosovker et al. | | |

(Continued)

OTHER PUBLICATIONS

Mell, Peter, et al., The NIST Definition of Cloud Computing, National Institute of Standards and Technology, Oct. 7, 2009, Version 15, NIST, Gaithersburg, MD, US.

(Continued)

*Primary Examiner* — Emerson Puente
*Assistant Examiner* — Mehran Kamran
(74) *Attorney, Agent, or Firm* — Kevin Kehe; Jay Wahlquist

(57) ABSTRACT

Disclosed aspects manage virtual machine migration on a shared pool of configurable computing resources. A virtual machine is monitored in order to identify a set of migration data with respect to the virtual machine. A set of migration events is detected with respect to the virtual machine. Based on the set of migration events, the set of migration data is collected. In response to a triggering event, a determination is made whether to migrate the virtual machine from a current host based on the set of migration data. In accordance with the determination, a selection can be made whether to migrate the virtual machine from the current host.

19 Claims, 7 Drawing Sheets

(56) References Cited

U.S. PATENT DOCUMENTS

| | | | |
|---|---|---|---|
| 2011/0138384 A1* | 6/2011 | Bozek | H04L 41/0806 718/1 |
| 2012/0030669 A1* | 2/2012 | Tsirkin | G06F 9/45533 718/1 |
| 2012/0102190 A1* | 4/2012 | Durham | H04L 41/0823 709/224 |
| 2013/0054734 A1* | 2/2013 | Bond | G06F 9/4856 709/217 |
| 2013/0097296 A1* | 4/2013 | Gehrmann | G06F 9/4856 709/223 |
| 2013/0219389 A1* | 8/2013 | Serebrin | G06F 9/455 718/1 |
| 2013/0247043 A1* | 9/2013 | Bingham | G06F 9/45533 718/1 |
| 2013/0311988 A1* | 11/2013 | Boss | G06F 9/4862 718/1 |
| 2013/0339956 A1* | 12/2013 | Murase | G06F 9/505 718/1 |
| 2014/0019723 A1* | 1/2014 | Yamada | G06F 1/3293 712/208 |
| 2014/0040892 A1* | 2/2014 | Baset | G06F 9/455 718/1 |
| 2014/0129808 A1* | 5/2014 | Naveh | G06F 9/4856 712/225 |
| 2014/0165063 A1* | 6/2014 | Shiva | G06F 21/57 718/1 |
| 2014/0196042 A1* | 7/2014 | Nakata | G06F 9/4856 718/1 |
| 2014/0223556 A1* | 8/2014 | Bignon | H04L 63/1441 726/22 |
| 2015/0007178 A1 | 1/2015 | Kaneko et al. | |
| 2015/0248303 A1* | 9/2015 | Noel | G06F 9/4856 718/1 |
| 2015/0254095 A1* | 9/2015 | Louzoun | H04L 69/16 718/1 |
| 2016/0004564 A1* | 1/2016 | Park | G06F 9/50 718/104 |
| 2016/0062785 A1* | 3/2016 | Kumeta | G06F 9/45558 718/1 |
| 2016/0224484 A1* | 8/2016 | Bonzini | G06F 13/32 |

OTHER PUBLICATIONS

Cui, L. et al.; "VMScatter: migrate virtual machines to many hosts"; ACM SIGPLAN Notices, vol. 48, No. 7, pp. 63-72; Jul. 2013.

Anonymously; "Utilizing AMD (Active Memory De-duplilcation) to optimize network bandwidth and improve the performance during LPM (Live Partition Migration)"; An IP.com Prior Art Database Technical Disclosure; http://ip.com/IPCOM/000240296; Jan. 21, 2015.

Anonymously; "Management framework for efficient live migration of virtual machines running migration-aware applications"; An IP.com Prior Art Database Technical Disclosure; http://ip.com/IPCOM/000200260; Oct. 3, 2010.

Anonymously; "VM Migration based on multi criterion ranking of Hypervisors and Virtual Machines in Software Defined Data Center (SDDC) Environments"; An IP.com Prior Art Database Technical Disclosure; http://ip.com/IPCOM/000240063; Dec. 29, 2014.

Wolke, Andreas et al.; "Planning vs. dynamic control: Resource allocation in corporate clouds"; IEEE Transactions on Cloud Computing Jan. 2015; <http://dss.in.tum.de/files/bichler-research/2015. IEEE_TCC.Wolke.Proactive.pdf>.

VMware, Inc.; "DRS Performance and Best Practices"; <http://www.vmware.com/files/pdf/drs_performance_best_practices_wp.pdf>.

Cropper et al., "Virtual Machine Migration Management", U.S. Appl. No. 14/940,081, filed Nov. 12, 2015.

List of IBM Patents or Patent Applications Treated as Related.

* cited by examiner

VIRTUAL MACHINE MIGRATION MANAGEMENT

BACKGROUND

This disclosure relates generally to computer systems and, more particularly, relates to virtual machine migration management on a shared pool of configurable computing resources. The amount of data that needs to be managed by enterprises is increasing. Management of a set of assets may be desired to be performed as efficiently as possible. As data needing to be managed increases, the need for management efficiency may increase.

SUMMARY

Aspects of the disclosure can keep a time-boxed history or cache of migrations of the virtual machine which may be used to avoid redundant/superfluous migrations. Aspects include a historical data retention mechanism whose values have a time-to-live. Aspects store features of prior operations to enable a determination which can prevent multiple similar, identical, or equivalent operations within a certain period of time. Using the techniques described herein, the number of erroneous and redundant virtual machine migrations may be reduced. As such, positive impacts on performance or efficiency such as reduced demands on the cloud infrastructure may occur.

Disclosed aspects manage virtual machine migration on a shared pool of configurable computing resources. A virtual machine is monitored in order to identify a set of migration data with respect to the virtual machine. A set of migration events is detected with respect to the virtual machine. Based on the set of migration events, the set of migration data is collected. In response to a triggering event, a determination is made whether to migrate the virtual machine from a current host based on the set of migration data. In accordance with the determination, a selection can be made whether to migrate the virtual machine from the current host.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
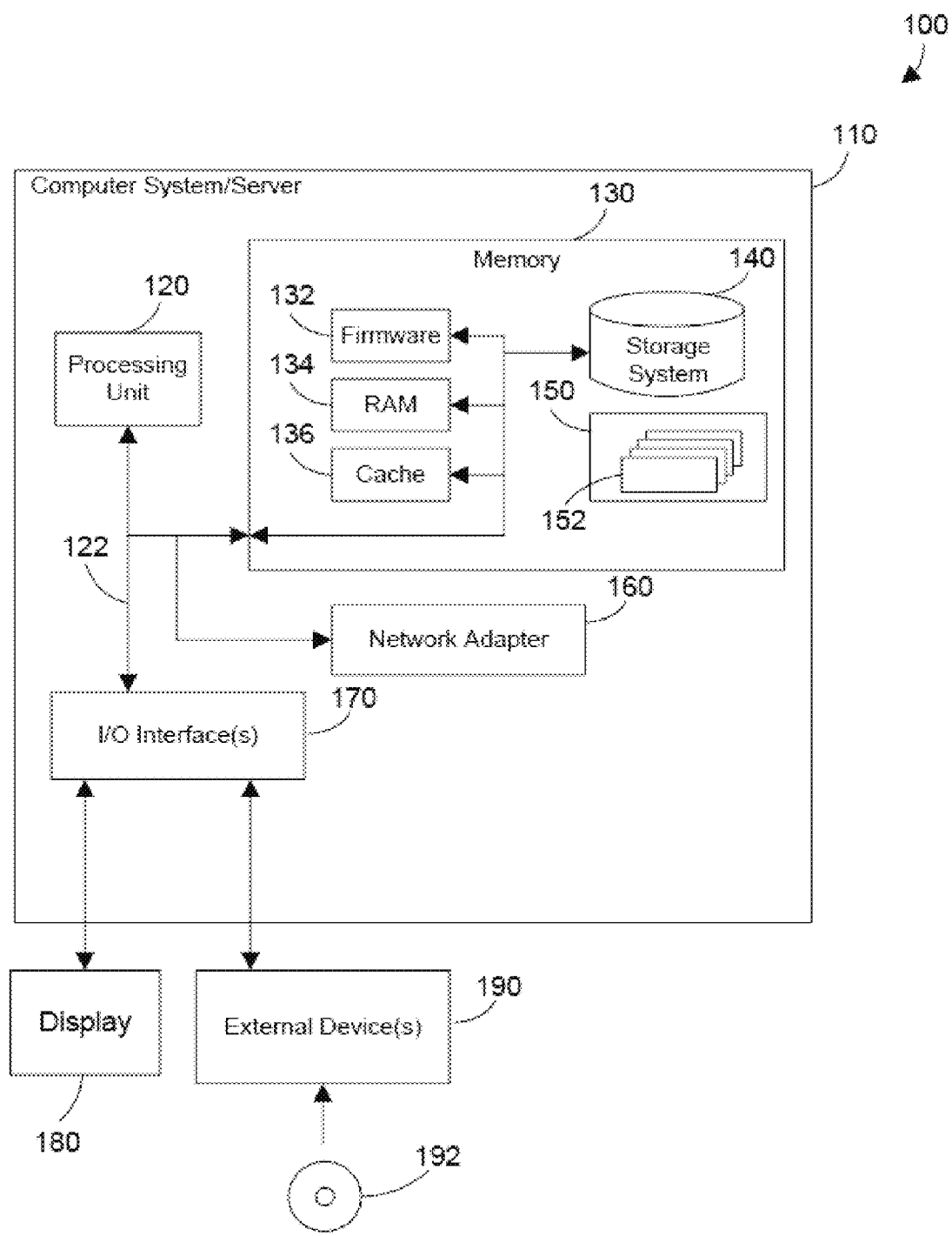
FIG. 1 depicts a cloud computing node according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure can keep a time-boxed history or cache of migrations of the virtual machine which may be used to avoid redundant/superfluous migrations. Aspects include a historical data retention mechanism whose values have a time-to-live. Aspects store features of prior operations to enable a determination which can prevent multiple similar, identical, or equivalent operations within a certain period of time. Using the techniques described herein, the number of erroneous and redundant virtual machine migrations may be reduced. As such, positive impacts on performance or efficiency such as reduced demands on the cloud infrastructure may occur.

Within cloud computing environments, resource imbalances can present challenges to cloud administrators. For example, processor utilization or memory utilization imbalances during peak usage times may cause other workloads to encounter decreased performance. Similar challenges can occur with respect to input-output imbalances in terms of storage or network resources, and related reduced performance. To attempt to re-balance cloud environments, virtual machine live migration may be used to move virtual machines to under-utilized hosts in order to positively impact the imbalance challenges.

In certain systems, heuristics may be used to determine how many virtual machines to migrate, which destination/target hosts should be selected, how often to reconfigure the environment (e.g., how frequently virtual machine migrations can be performed), etc. Redundant migrations may occur due to the heuristic nature. For example, a virtual machine may migrate back and forth (e.g., "ping-pong") between hosts, or the virtual machine may be repetitively/continuously migrated (e.g., because the virtual machine is generating significant processor, memory or input-output traffic on its source/current host). For instance, with two hosts a virtual machine can repetitively/continually bounce between the two hosts over a period of time (e.g., because the virtual machine's workload characteristics may be unpredictable due to factors such as random processor bursts). As such, an asset manager can attempt to positively impact the overall system but produce a greater challenge (e.g., because the attempt may not be based on a sustained workload pattern).

Aspects of the disclosure include a method, system, and computer program product for virtual machine migration management on a shared pool of configurable computing resources. A virtual machine is monitored in order to identify a set of migration data with respect to the virtual machine. A set of migration events is detected with respect to the virtual machine (e.g., one or more live migrations of the virtual machine). Based on the set of migration events, the set of migration data (e.g., a set of temporal identifiers which corresponds with the set of migration events, a set of host identifiers which corresponds with the set of migration events) is collected. In response to a triggering event, a determination is made whether to migrate the virtual machine from a current host based on the set of migration data. In accordance with the determination, a selection can be made whether to migrate the virtual machine from the current host.

In embodiments, migration of the virtual machine from the current host may be prevented if the set of migration data indicates that the virtual machine has been migrated from the current host within a threshold temporal period. In embodiments, the virtual machine may be migrated from the current host if the set of migration data indicates that the virtual machine has not been migrated from the current host within a threshold temporal period. In embodiments, a residency value may be calculated (based on the set of migration data). The residency value can indicate a number of hosts the virtual machine has resided-on within a threshold temporal period. The residency value may be compared with a threshold residence value. In response to the residency value exceeding the threshold residence value, migration of the virtual machine from the current host may be prevented. Altogether, performance or efficiency benefits when managing a set of assets may occur (e.g., speed, flexibility, load-balancing, responsiveness, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
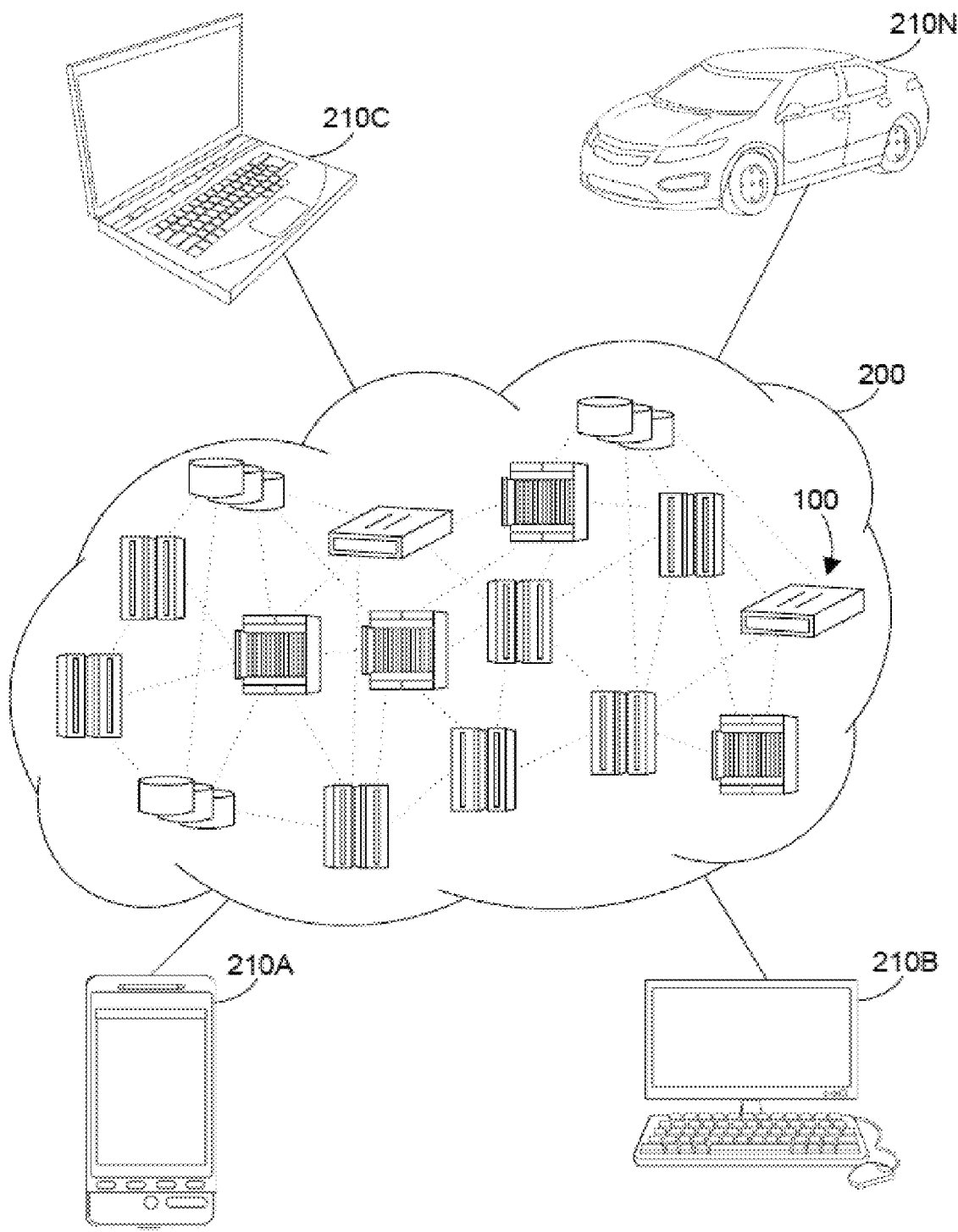
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
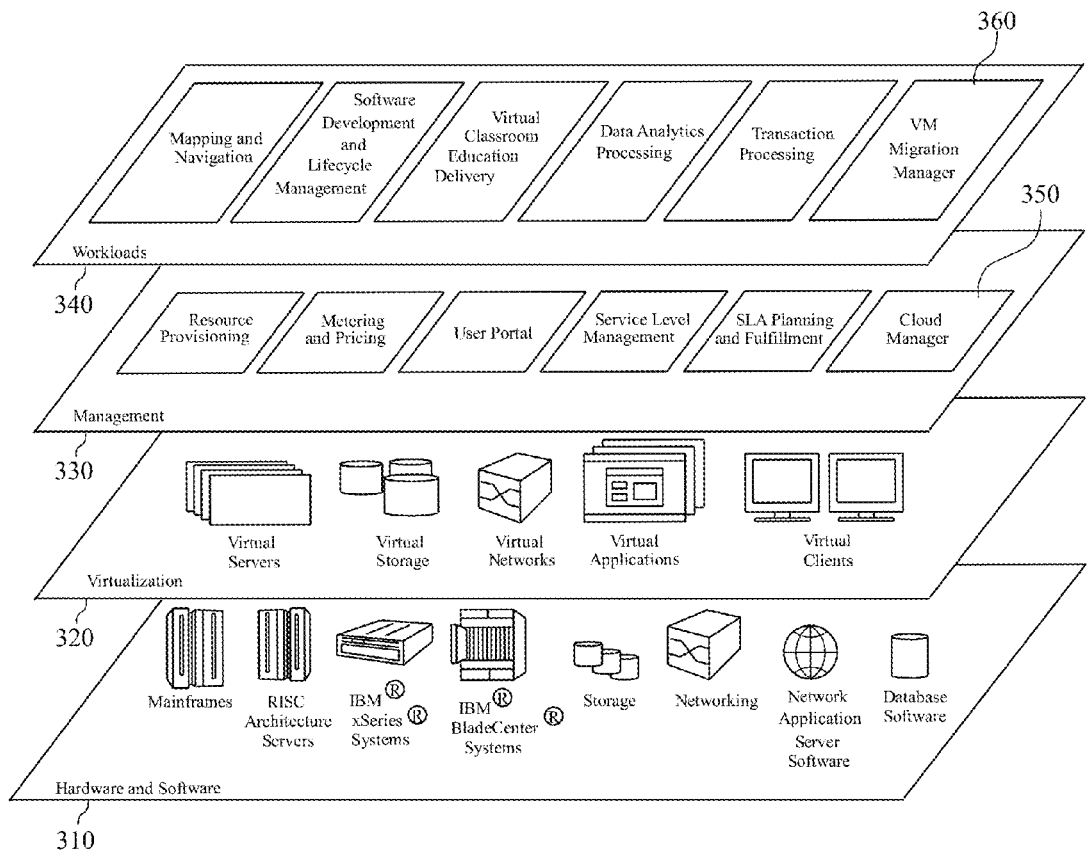
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM Web Sphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a virtual machine migration manager 360, which may manage whether to migrate one or more virtual machines as discussed in more detail below.

Figure 4:
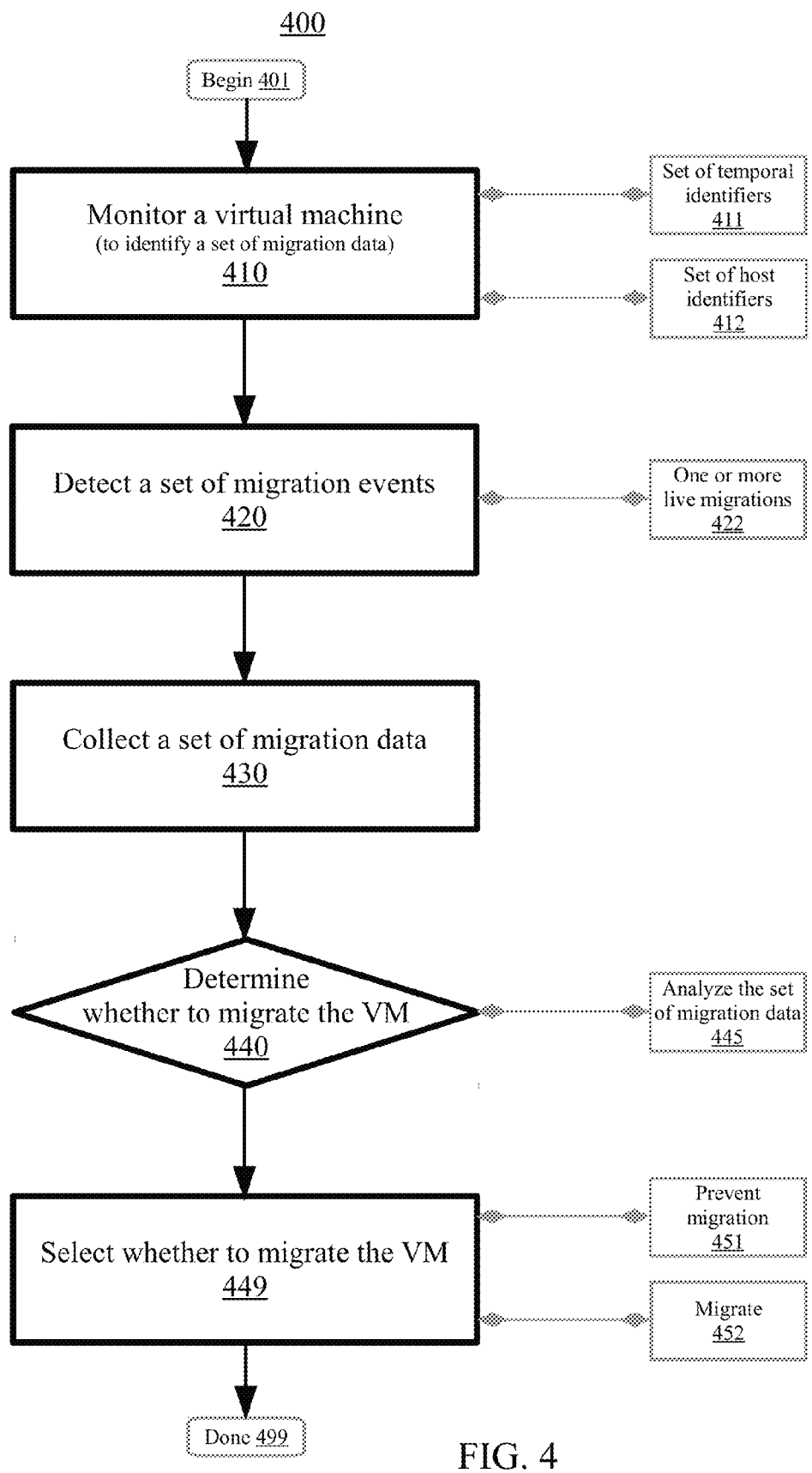
FIG. 4 is a flowchart illustrating a method for virtual machine migration management on a shared pool of configurable computing resources according to embodiments.

FIG. 4 is a flowchart illustrating a method 400 for virtual machine migration management on a shared pool of configurable computing resources according to embodiments. The shared pool of configurable computing resources may utilize a controller such as a cloud manager to execute/carry-out processes/tasks. Method 400 may begin at block 401.

At block 410, a virtual machine is monitored in order to identify a set of migration data with respect to the virtual machine. The virtual machine can include a system virtual machine providing a complete system platform which supports the execution of a complete operating system. The virtual machine can include a process virtual machine that is designed to run a single program (e.g., supporting a single process). In embodiments, the set of migration data includes a set of temporal identifiers (e.g., 01012015_223456) which corresponds with a set of migration events at block 411. In embodiments, the set of migration data includes a set of host identifiers (e.g., Host-A) which corresponds with a set of migration events at block 412. For example, a (persistent) cache can retain a set of source hosts from which a virtual machine is migrated, a set of target hosts to which the virtual machine is migrated, or a timestamp of the migration operation (e.g., cache[vm][source_host]=timestamp_of_migration). The cache may indicate how many hosts the virtual machine has been on within a (user-configured/predetermined) temporal period (e.g., a count of the length of the list of the cache[vm]).

In embodiments, monitoring the virtual machine may include observing or analyzing the virtual machine. In certain embodiments, observing or analyzing can include aspects which sense an element and process the element that was sensed. For instance, observing can include querying (e.g., asking a question), searching (e.g., exploring for a reason), obtaining (e.g., recording a collection), probing (e.g., checking a property), scanning (e.g., reviewing a sample), or tracking (e.g., following a characteristic). For instance, analyzing can include extracting (e.g., creating a derivation), examining (e.g., performing an inspection), dissecting (e.g., scrutinizing an attribute), parsing (e.g., deciphering a construct), comparing (e.g., relating an assessment), or classifying (e.g., assigning a designation). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided) for further use.

At block 420, a set of migration events is detected with respect to the virtual machine (e.g., one or more live migrations of the virtual machine at block 422). Detecting can include observing, sensing, scanning for a modification/status, or identifying a change/state. The set of migration events may include one or more live migrations. A live migration may include a process of moving a running virtual machine or application between different physical machines without disconnecting the client or application. Memory, storage, and network connectivity of the virtual machine may be transferred from the source to the target. The set of migration events may be associated with the set of migration data (e.g., a set of temporal identifiers, a set of host identifiers). Other examples of migration data include but are not limited to total migration time, the time a virtual machine is unresponsive during migration, whether the migration was executed as scheduled/planned, impact on other systems running, the amount of data transferred over the network during migration, or the amount of computing resources used with respect to the migration.

At block 430, based on the set of migration events, the set of migration data (e.g., a set of temporal identifiers which corresponds with the set of migration events, a set of host identifiers which corresponds with the set of migration events) is collected. Collecting can include accumulating, acquiring, aggregating, capturing, gathering, obtaining, saving, or storing. The set of migration data may be collected in a multidimensional array, database, or other data store. For example, a virtual machine may be migrated from Host-A to Host-B at noon (e.g., 120000). Based on the migration, associated data related to the source (Host-A), the target (Host-B), and the time (120000) may be recorded.

At block 440, in response to a triggering event, a determination is made whether to migrate the virtual machine from a current host based on the set of migration data. For example, the determination may answer whether the virtual machine has been migrated from the current host within a threshold temporal period. In embodiments, the triggering event may include a request to migrate the virtual machine (e.g., by a cloud/resource manager, by a user/administrator). In embodiments, the triggering event may include a host resource value exceeding a threshold value (e.g., the virtual machine is using more memory/processing-power on Host-A than is recommended and could be more efficient on another host). In embodiments, the triggering event includes an error event with respect to the virtual machine (e.g., an application running on the virtual machine cannot process data at an appropriate rate due to a network bandwidth slow-down).

The determination may, for instance, use the set of temporal identifiers or the set of host identifiers from the set of migration data. Such information may be compared (or analyzed as at block 445) with respect to a current host which has the virtual machine or a threshold temporal period. The threshold temporal period may include a timeframe which the virtual machine is to reside on a host without being migrated to another host (e.g., to positively impact challenges with respect to repetitively/continuously migrating a virtual machine or a "ping-pong" effect). In embodiments, the set of migration data may include the threshold temporal period. For example, the threshold temporal period may be a user input (e.g., 1 day, 1 hour, 20 minutes). The threshold temporal period may include a predetermined time-to-live value (e.g., 45 minutes after migration to the current host, 30 seconds after completing a round of processing). The threshold temporal period may include an on-peak time-frame (e.g., must reside on the current host for at least 1 hour between 8 am and 5 pm) or an off-peak time-frame (e.g., 0 seconds between 2 am and 5 am allowing effectively any migration that is requested). The threshold temporal period can include a current usage-factor with respect to the virtual machine (e.g., if the virtual machine is currently being used heavily the threshold temporal period may be longer so that processing of user-data may continue without further delay, or vice versa) or an expected usage-factor with respect to the virtual machine (e.g., if the virtual machine is expected to go relatively unused in an upcoming time-frame the threshold temporal period may be shorter to allow the migration requests to take place, or vice versa).

At block 449, a selection can be made whether to migrate the virtual machine from the current host (e.g., according with the determination). For example, a first parameter value can be chosen for a parameter instead of a second parameter value. Based on the set of migration data indicating that the virtual machine has been migrated from the current host within a threshold temporal period, migration of the virtual machine from the current host may be prevented at block 451 (e.g., by selecting a prevention parameter value). For example, if the virtual machine was migrated from Host-A to Host-B at 10 am, and was migrated back to Host-A at 11 am, then the virtual machine may be prevented from being migrated from Host-A until 1 pm when the threshold temporal period is 3 hours. Preventing can include rejecting, not allowing, prohibiting, blocking, disregarding, suppressing, ignoring, precluding, or at least deterring. Preventing migration of the virtual machine may have positive impacts with respect to the number of erroneous or redundant migrations made. As such, results may include reduced demands on a cloud infrastructure (e.g., processor, memory, storage, and network utilization need not be wasted on superfluous migration operations).

Based on the set of migration data indicating that the virtual machine has not been migrated from the current host within a threshold temporal period, the virtual machine may be migrated from the current host at block 452 (e.g., including selecting a migration parameter value). For example, if the virtual machine was migrated from Host-A to Host-B at 10 am, and was migrated back to Host-A at 11 am, then the virtual machine may be allowed to be migrated from Host-A in response to a request at 2 pm when the threshold temporal period is less than 4 hours. Various embodiments may include source/current/destination/target hosts, and the examples provided are illustrative. Similarly, a temporal factors may be used, changed, or weighted in different ways in dependence upon varying configurations.

Method 400 concludes at block 499. Aspects of method 400 may provide performance or efficiency benefits for virtual machine migration management on a shared pool of configurable computing resources. For example, aspects of method 400 may include positive impacts on network utilization or workload productivity. Altogether, performance or efficiency benefits for virtual machine migration management may occur (e.g., speed, flexibility, responsiveness, resource usage).

Figure 5:
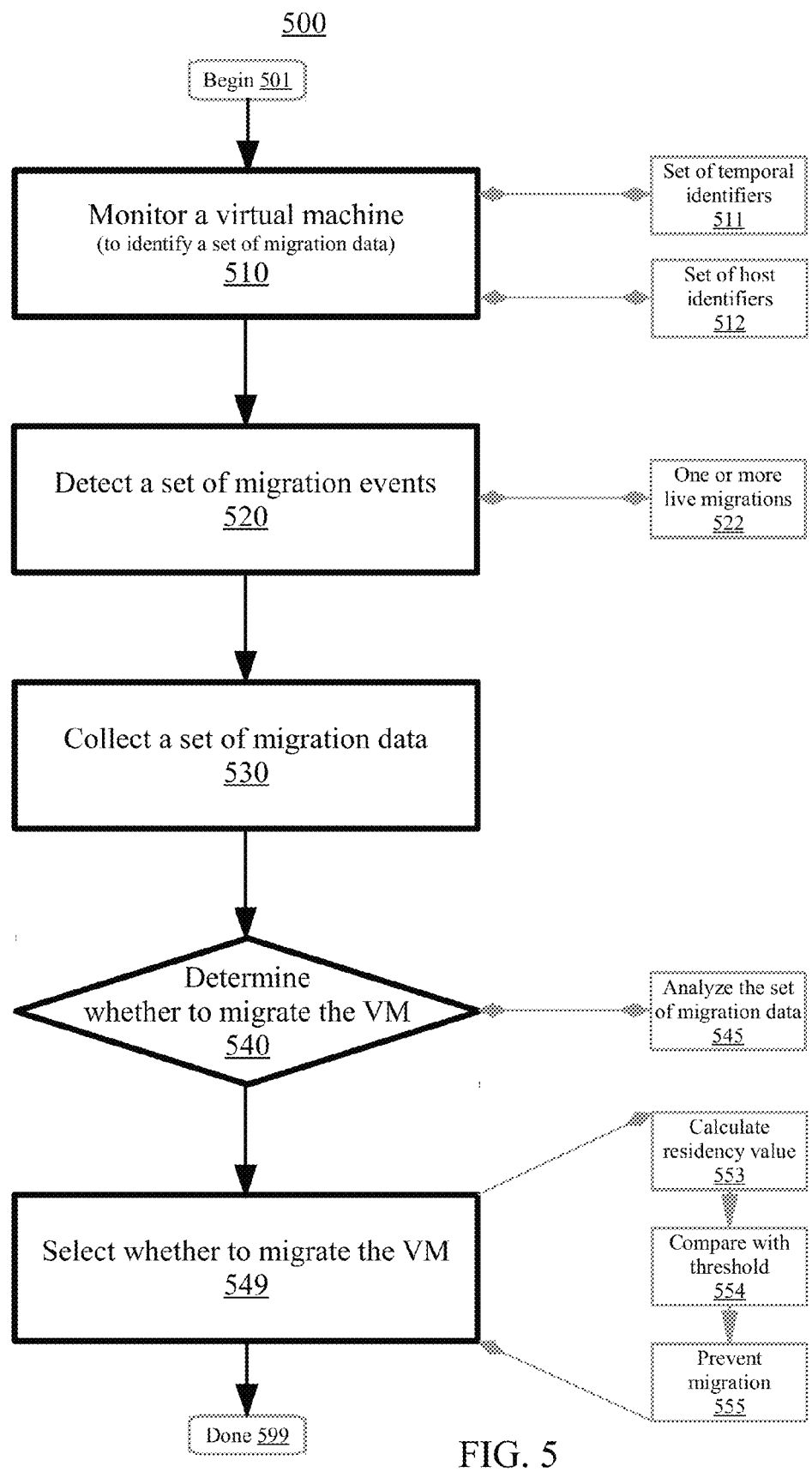
FIG. 5 is a flowchart illustrating a method for virtual machine migration management on a shared pool of configurable computing resources according to embodiments.

FIG. 5 is a flowchart illustrating a method 500 for virtual machine migration management on a shared pool of configurable computing resources according to embodiments. Aspects of method 500 may be similar to or the same as method 400, and aspects of the methods 400 and 500 may be used interchangeably. The shared pool of configurable computing resources may utilize a controller such as a cloud manager to execute/carry-out processes/tasks. Method 500 may begin at block 501.

At block 510, a virtual machine is monitored in order to identify a set of migration data with respect to the virtual machine. In embodiments, the set of migration data includes a set of temporal identifiers (e.g., 06122015_060514) which corresponds with a set of migration events at block 511. In embodiments, the set of migration data includes a set of host identifiers (e.g., Host-D) which corresponds with a set of migration events at block 512. At block 520, a set of migration events is detected with respect to the virtual machine (e.g., one or more live migrations of the virtual machine at block 522). At block 530, based on the set of migration events, the set of migration data (e.g., a set of temporal identifiers which corresponds with the set of migration events, a set of host identifiers which corresponds with the set of migration events) is collected.

At block 540, in response to a triggering event, a determination is made whether to migrate the virtual machine from a current host based on the set of migration data. For example, the determination may ascertain how many hosts the virtual machine has resided-on within a threshold temporal period. The determination may, for instance, use the set of temporal identifiers or the set of host identifiers from the set of migration data. With respect to a threshold temporal period, such information may be analyzed as at block 545.

To illustrate, using both the set of temporal identifiers (see block 511) and the set of host identifiers (see block 512), the set of migration data may be analyzed to determine whether to migrate the virtual machine from the current host. For instance, analyzing can include extracting (e.g., creating a derivation), examining (e.g., performing an inspection), scanning (e.g., reviewing a sample), evaluating (e.g., generating an appraisal), dissecting (e.g., scrutinizing an attribute), resolving (e.g., ascertaining an observation/conclusion/answer), parsing (e.g., deciphering a construct), querying (e.g., asking a question), searching (e.g., exploring for a reason/ground/motivation), comparing (e.g., relating an assessment), classifying (e.g., assigning a designation), or categorizing (e.g., organizing by a feature). Data analysis may include a process of inspecting, cleaning, transforming, or modeling data to discover useful information, suggest conclusions, or support decisions. Data analysis can extract information/patterns from a data set and transform/translate it into an understandable structure (e.g., a data report which can be provided/furnished) for further use.

At block 549, a selection can be made whether to migrate the virtual machine from the current host (e.g., according with the determination). For example, a first parameter value (e.g., preventing migration) can be chosen for a parameter instead of a second parameter value (e.g., allowing migration). In embodiments, based on the set of migration data, a residency value which indicates a number of hosts the virtual machine has resided-on within a threshold temporal period may be calculated at block 553. The residency value may be an arithmetic count of hosts having the virtual machine (e.g., hosts the virtual machine has been migrated to/from, hosts the virtual machine has resided-on for a specified amount of time such as a threshold temporal period). In certain embodiments, the residency value accounts for a plurality of stops on one host (e.g., counting every single stop on the one host, counting only once for the one host regardless of how many stops, counting every stop on the one host after the first stop as a partial stop such as a half-stop).

The residency value can be compared with a threshold residence value at block 554. The threshold residence value may indicate an acceptable number of stops for the virtual machine (e.g., within the threshold temporal period). For example, it may be acceptable for the virtual machine to have resided-on 3 hosts in a 1 hour period, but 4 may be considered too many (for performance/efficiency reasons). In response to the residency value exceeding the threshold residence value, migration of the virtual machine from the current host may be prevented at block 555. In the example, migration may be prevented when the virtual machine has resided-on 4 hosts in the 1 hour period. In various embodiments, the virtual machine may be flagged as a challenging virtual machine for a user/administrator to later analyze. In certain embodiments, migration may take place after a newly calculated number of hosts in a 1 hour period does not exceed the threshold (e.g., waiting a few minutes and the very first host the virtual machine was migrated from no longer counts so that the residency value is then 3 and no longer exceeds the threshold). As such, challenges relating to a virtual machine being frequently/repeatedly/endlessly migrated may be successfully addressed using aspects described herein.

Method 500 concludes at block 599. Aspects of method 500 may provide performance or efficiency benefits for virtual machine migration management on a shared pool of configurable computing resources. For example, aspects of method 500 may include positive impacts on network utilization or workload productivity. Altogether, performance or efficiency benefits for virtual machine migration management may occur (e.g., speed, flexibility, responsiveness, resource usage).

Figure 6:
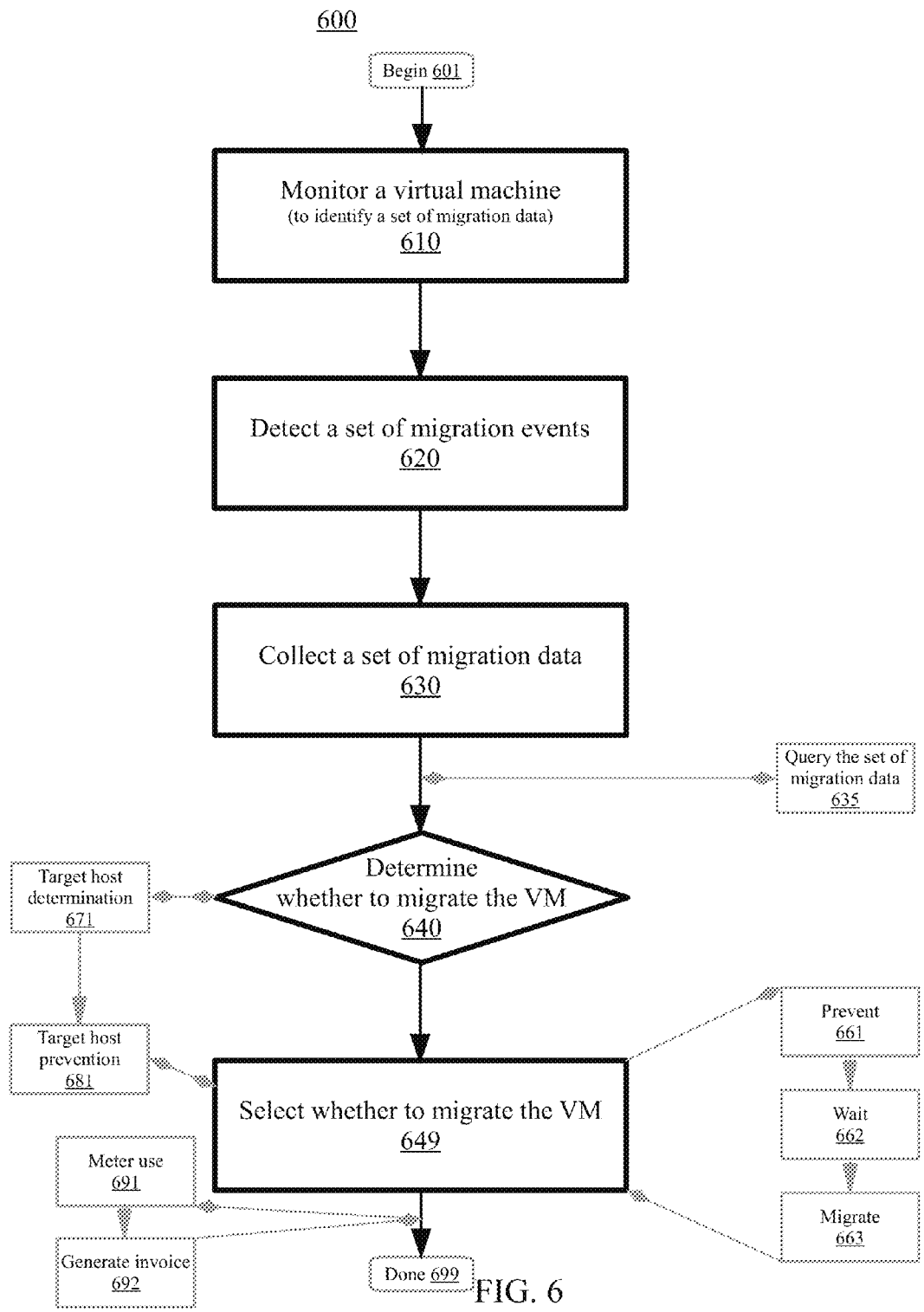
FIG. 6 is a flowchart illustrating a method for virtual machine migration management on a shared pool of configurable computing resources according to embodiments.

FIG. 6 is a flowchart illustrating a method 600 for virtual machine migration management on a shared pool of configurable computing resources according to embodiments. Aspects of method 600 may be similar to or the same as methods 400 or 500, and aspects of the methods 400, 500, and 600 may be used interchangeably. The shared pool of configurable computing resources may utilize a controller such as a cloud manager to execute/carry-out processes/tasks. Method 600 may begin at block 601.

At block 610, a virtual machine is monitored in order to identify a set of migration data with respect to the virtual machine. In embodiments, the set of migration data includes a set of temporal identifiers (e.g., 11012015_221411) which corresponds with a set of migration events. In embodiments, the set of migration data includes a set of host identifiers (e.g., Host-Q) which corresponds with a set of migration events. At block 620, a set of migration events is detected with respect to the virtual machine (e.g., one or more live migrations of the virtual machine). At block 630, based on the set of migration events, the set of migration data (e.g., a set of temporal identifiers which corresponds with the set of migration events, a set of host identifiers which corresponds with the set of migration events) is collected.

In embodiments, in response to a triggering event, the set of migration data may be queried/searched at block 635 (e.g., sending for and retrieving information). Also in response to the triggering event, a determination can be made at block 640 as to whether to migrate the virtual machine from a current host based on the set of migration data. In embodiments, in response to the triggering event and based on the set of migration data, it may be determined whether to migrate the virtual machine to a target/destination host at block 671. The determination(s) may, for instance, use the set of temporal identifiers or the set of host identifiers from the set of migration data. For example, determining whether to migrate to the target host may utilize similar methodologies as determining whether to migrate from a current host (e.g., as described herein). To illustrate, using both the set of temporal identifiers and the set of host identifiers, the set of migration data may be analyzed to determine whether to migrate the virtual machine to the target host.

At block 649, a selection can be made whether to migrate the virtual machine from the current host (e.g., according with the determination). For example, a first parameter value (e.g., preventing migration) can be chosen for a parameter instead of a second parameter value (e.g., allowing migration). In embodiments, based on the set of migration data indicating that the virtual machine has resided-on the target host within a threshold temporal period, migration of the virtual machine to the target host may be prevented at block 681. For example, if the virtual machine has resided-on the target host within the past 30 minutes, migration to the target host can be prevented.

In embodiments, migration of the virtual machine from the current host (or to the target host) may be prevented at block 661. In response to preventing migration of the virtual machine from the current host (or to the target host), a threshold temporal period may be waited-for at block 662. In response to waiting the threshold temporal period, the virtual machine can be migrated from the current host (to the target host) at block 663. For example, a migration which was initially prevented may be allowed subsequent to the threshold temporal period no longer being applicable (e.g., waiting 12 hours to transition from an on-peak time-frame to an off-peak time-frame).

In embodiments, a usage assessment may be generated with respect to the virtual machine migration management. Use of the virtual machine migration management may be metered at block 691. For example, migrations prevented may be measured based on factors such as network utilization saved, virtual machine productivity time-lines achieved, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 692. The generated invoice may be provided (e.g., displayed in a dialog box, sent or transferred by e-mail, text message, traditional mail) to the user for notification, acknowledgment, or payment.

Method 600 concludes at block 699. Aspects of method 600 may provide performance or efficiency benefits for virtual machine migration management on a shared pool of configurable computing resources. For example, aspects of method 600 may include positive impacts on network utilization or workload productivity. Altogether, performance or efficiency benefits for virtual machine migration management may occur (e.g., speed, flexibility, responsiveness, resource usage).

Figure 7:
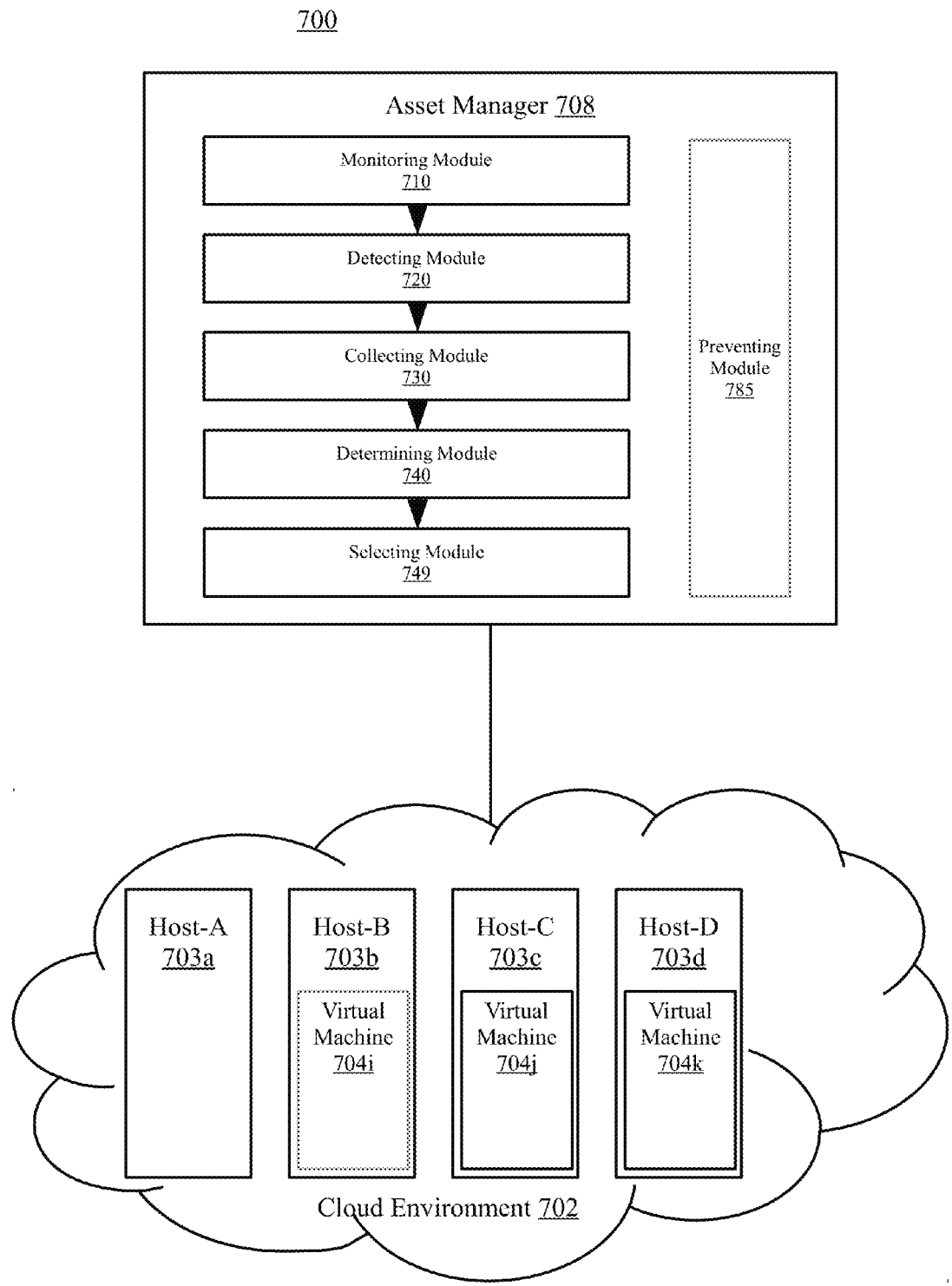
FIG. 7 shows a system for virtual machine migration management on a shared pool of configurable computing resources according to embodiments.

FIG. 7 shows a system 700 for virtual machine migration management on a shared pool of configurable computing resources according to embodiments. In embodiments, methods 400, 500, or 600 may be implemented in an asset manager 708. The asset manager may be a module that is at least a portion of a cloud manager. As such, aspects of the discussion related to FIGS. 4, 5, 6 and methods 400, 500, 600 may be used/applied/implemented in the system 700. Asset manager 708 may be implemented in hardware, software or firmware executable on hardware, or a combination thereof.

The shared pool of configurable computing resources (e.g., cloud environment 702) can include a set of hosts such as a set of hosts 703 including specific hosts Host-A 703*a*, Host-B 703*b*, Host-C 703*c*, Host-D 703*d*. The set of hosts 703 can include a set of virtual machines 704 illustrated as specific virtual machines 704*i*, 704*j*, 704*k*. The cloud environment 702, and aspects thereof, may be associated with a shared pool manager (e.g., cloud manager) having the asset manager 708. In embodiments, the asset manager 708 may be sufficiently stand-alone and associated directly with the cloud environment 702. The asset manager 708 can manage migration operations of virtual machines on the set of hosts. In embodiments, the asset manager 708 can have a (graphical) user interface that allows a user to interact with the asset manager 708 to provide user input, etc. Of course, asset manager 708 could include many other features or functions known in the art that are not shown in FIG. 7.

Asset manager 708 can include a monitoring module 710 (see discussion with respect to blocks 410/510/610 of FIG. 4/5/6), a detecting module 720 (see discussion with respect to block 420/520/620 of FIG. 4/5/6), a collecting module 730 (see discussion with respect to block 430/530/630 of FIG. 4/5/6), a determining module 740 (see discussion with respect to block 440/540/640 of FIG. 4/5/6), and a selecting module 749 (see discussion with respect to block 449/549/649 of FIG. 4/5/6). Asset manager 708 may have a preventing module 785 (see discussion with respect to block 451/555/681 of FIG. 4/5/6). In general, the asset manager may generate, tear-down, migrate, prevent migration, or otherwise manage one or more virtual machines.

Aspects of system 700 may positively impact virtual machine migration management with respect to redundant/superfluous virtual machine operations (e.g., live migrating virtual machines) to rebalance overall host load within a cloud. For example, system 700 may positively impact what otherwise might result in "ping-pong" migrations (e.g., migrating a virtual machine off a host, back to the host, off of the host, and so on). To illustrate, a persistent cache may be structured to retain information related to the source host(s) from which a virtual machine is migrated and the timestamp of the operation (cache[vm][source_host]=timestamp_of_migration). Prior to a virtual machine migration being allowed, the cache may be queried to see if the virtual machine has been migrated off the source/current host (e.g., has VM 704*i* been migrated off of Host-B 703*b*?). If not, the migration may be allowed. If so and the time-to-live (e.g., temporal period) has elapsed (e.g., VM 704*i* has been migrated off of Host-B 703*b* but that was 24 hours ago and the threshold temporal period is 12 hours), the migration may be allowed. Otherwise, the migration request may be denied/rejected/prevented (e.g., VM 704*i* was migrated off of Host-B 703*b* 1 minute ago and the threshold temporal period is 3 hours). As such, aspects herein can positively impact what otherwise may result in "ping-pong" migrations within the time-to-live temporal period.

Likewise, aspects of system 700 may have positive impacts with respect to a repetitive/continuous migration of a virtual machine (not necessarily to the same hosts) due to unpredictable processor load patterns (e.g., it may be challenging to predict what the load will be after a virtual machine is migrated to a new host which can occur—for example—with respect to web server traffic). Using a persistent cache structure, a number of hosts that the virtual machine has resided-on within a temporal period can be computed (e.g., determine a number of entries of cache[vm] during the temporal period). If the computed number does not exceed a threshold number of hosts (e.g., VM 704*i* has been on Host-B 703*b*, Host-C 703*c*, and Host-D 703*d* but not Host-A 703*a* when the threshold number of hosts is 3 hosts), the migration may be allowed. Otherwise, the migration request may be denied/rejected/prevented. As such, the number of times a virtual machine can be migrated per a unit of time may be positively impacted.

Aspects of the disclosure can keep a time-boxed history or cache of migrations of the virtual machine which may be used to avoid redundant/superfluous migrations. Aspects include a historical data retention mechanism whose values have a time-to-live. Aspects store features of prior operations to enable a determination which can prevent multiple similar, identical, or equivalent operations within a certain period of time. Using the techniques described herein, the number of erroneous and redundant virtual machine migrations may be reduced. As such, positive impacts on performance or efficiency such as reduced demands on the cloud infrastructure may occur.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein is for the purpose of describing particular embodiments only and is not intended to be limiting of the various embodiments. As used herein, the singular forms "a," "an," and "the" are intended to include the plural forms as well, unless the context clearly indicates otherwise. "Set of," "group of," "bunch of," etc. are intended to include one or more. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system for virtual machine migration management on a shared pool of configurable computing resources, the system comprising:
    a memory having a set of computer readable computer instructions, and
    a processor for executing the set of computer readable instructions, the set of computer readable instructions including:
    detecting a set of migration events with respect to both:
    a current host, and
    a virtual machine;
    collecting, based on the set of migration events, a set of migration data;
    analyzing the set of migration data with respect to both the current host and the virtual machine;
    determining, based on the set of migration data indicating that the virtual machine has been migrated from the current host within a threshold temporal period, to prevent migration of the virtual machine from the current host;
    configuring the threshold temporal period to include a time-frame which the virtual machine is to reside on the current host without being migrated to another host; and
    preventing, based on the set of migration data indicating that the virtual machine has been migrated from the current host within the threshold temporal period, migration of the virtual machine from the current host.

2. The system of claim 1, further comprising:
    calculating, based on the set of migration data, a residency value which indicates a number of hosts the virtual machine has resided-on for a specified amount of time;
    comparing the residency value with a threshold residence value; and
    preventing, in response to the residency value exceeding the threshold residence value, migration of the virtual machine from the current host.

3. The system of claim 2, further comprising:
    configuring the residency value to be an arithmetic count of hosts that the virtual machine has resided-on for the specified amount of time.

4. The system of claim 2, further comprising:
    configuring the residency value to count every single stop on one or more hosts of a set of hosts of the shared pool of configurable computing resources.

5. The system of claim 2, further comprising:
    configuring the residency value to count only once for one or more stops on a single specific host of a set of hosts of the shared pool of configurable computing resources regardless of how many stops on the single specific host of the set of hosts of the shared pool of configurable computing resources.

6. The system of claim 2, further comprising:
    configuring the residency value to count:
    once for a first stop on a single specific host of a set of hosts of the shared pool of configurable computing resources, and
    a partial stop count for one or more stops after the first stop on the single specific host of the set of hosts of the shared pool of configurable computing resources.

7. The system of claim 1, further comprising:
querying, in response to an error event with respect to the virtual machine, the set of migration data, wherein the error event includes an application running on the virtual machine cannot process data at an appropriate rate due to a network bandwidth slow-down.

8. The system of claim 1, further comprising:
collecting, in the set of migration data, a set of temporal identifiers which corresponds with the set of migration events;
evaluating the set of temporal identifiers with respect to the threshold temporal period, wherein the set of temporal identifiers includes a timestamp of a historical migration operation from the current host; and
determining, based on the timestamp of the historical migration operation from the current host being within the threshold temporal period, to prevent migration of the virtual machine from the current host.

9. The system of claim 1, further comprising:
configuring the time-frame to include an amount of time after migration to the current host.

10. The system of claim 1, further comprising:
configuring the time-frame to include an amount of time after completing a round of processing.

11. The system of claim 1, further comprising:
configuring the threshold temporal period based on a current usage-factor with respect to the virtual machine on the current host.

12. The system of claim 11, further comprising:
increasing the threshold temporal period in response to the virtual machine on the current host indicating that the current usage-factor exceeds a threshold usage factor, and
decreasing the threshold temporal period in response to the virtual machine on the current host indicating that the current usage-factor does not exceed the threshold usage factor.

13. The system of claim 1, further comprising:
configuring the threshold temporal period based on an expected usage-factor with respect to the virtual machine on the current host.

14. The system of claim 13, further comprising:
increasing the threshold temporal period in response to the virtual machine on the current host indicating that the expected usage-factor exceeds a threshold usage factor, and
decreasing the threshold temporal period in response to the virtual machine on the current host indicating that the expected usage-factor does not exceed the threshold usage factor.

15. The system of claim 1, further comprising:
configuring the threshold temporal period to include an on-peak time-frame which the virtual machine is to reside on the current host without being migrated to another host for at least an amount of time between a first time-of-day and a second time-of-day.

16. The system of claim 1, further comprising:
determining, based on one or more entries of a cache with respect to the threshold temporal period, to prevent migration of the virtual machine from the current host.

17. The system of claim 16, further comprising:
computing, based on a number of entries of the cache during the threshold temporal period, a number of hosts that the virtual machine has resided-on within the threshold temporal period; and
preventing, based on the number of hosts that the virtual machine has resided-on within the threshold temporal period exceeding a threshold number of hosts, migration of the virtual machine from the current host.

18. A computer program product for virtual machine migration management on a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:
detecting a set of migration events with respect to both:
a current host, and
a virtual machine;
collecting, based on the set of migration events, a set of migration data;
analyzing the set of migration data with respect to both the current host and the virtual machine;
determining, based on the set of migration data indicating that the virtual machine has been migrated from the current host within a threshold temporal period, to prevent migration of the virtual machine from the current host;
configuring the threshold temporal period to include a time-frame which the virtual machine is to reside on the current host without being migrated to another host; and
preventing, based on the set of migration data indicating that the virtual machine has been migrated from the current host within the threshold temporal period, migration of the virtual machine from the current host.

19. A system for virtual machine migration management on a shared pool of configurable computing resources, the system comprising:
a memory having a set of computer readable computer instructions, and
a processor for executing the set of computer readable instructions, the set of computer readable instructions including:
detecting a set of migration events with respect to both:
a current host, and
a virtual machine;
collecting, based on the set of migration events, a set of migration data;
collecting, in the set of migration data, a set of temporal identifiers which corresponds with the set of migration events;
evaluating the set of temporal identifiers with respect to a threshold temporal period, wherein the set of temporal identifiers includes a timestamp of a historical migration operation from the current host;
configuring the threshold temporal period to include a time-frame which the virtual machine is to reside on the current host without being migrated to another host;
analyzing the set of migration data with respect to both the current host and the timestamp of the historical migration operation;
determining, based on the timestamp of the historical migration operation from the current host being within the threshold temporal period, to prevent migration of the virtual machine from the current host; and
preventing, based on the set of migration data indicating that the virtual machine has been migrated from the current host within the threshold temporal period, migration of the virtual machine from the current host.

* * * * *